United States Patent [19]
Nicot

[11] Patent Number: 5,731,529
[45] Date of Patent: Mar. 24, 1998

[54] DEVICE FOR MEASURING THE TORQUE OF A ROTATING SHAFT

[75] Inventor: Christophe Nicot, Annecy, France

[73] Assignee: The Torrington Company, Torrington, Conn.

[21] Appl. No.: 626,226

[22] Filed: Mar. 29, 1996

[30] Foreign Application Priority Data

Aug. 31, 1995 [FR] France ................... 95 10248

[51] Int. Cl.⁶ .................................... G02F 3/02
[52] U.S. Cl. .................. 73/862.326; 73/862.191; 73/862.321
[58] Field of Search ............. 76/862.321, 862.324, 76/862.326, 862.191, 862.325

[56] References Cited

U.S. PATENT DOCUMENTS

| | | | |
|---|---|---|---|
| 5,195,382 | 3/1993 | Peilloud | 73/862.321 |
| 5,394,760 | 3/1995 | Persson et al. | 73/862.325 X |
| 5,450,761 | 9/1995 | Zilberman et al. | 73/862.324 X |
| 5,490,431 | 2/1996 | O'mahoney et al. | 73/862.325 X |
| 5,501,110 | 3/1996 | Peilloud et al. | 73/862.321 |

FOREIGN PATENT DOCUMENTS 2 107 880  5/1983  United Kingdom.

*Primary Examiner*—Elizabeth L. Dougherty
*Attorney, Agent, or Firm*—John C. Bigler

[57] ABSTRACT

Two magnetic field generators are fixed symmetrically with respect to a shaft in a first plane perpendicular to the shaft, and two magnetic field detector units are fixed symmetrically with respect to the shaft, in a second plane parallel to, and axially offset with respect to, the first plane. The detector units deliver a signal proportional to the torque owing to the relative angular offset of the generators with respect to the detector units such that the plane median to the first plane and second plane passes through the point of maximum deflection of the shaft under a longitudinal flexion force.

5 Claims, 4 Drawing Sheets

DEVICE FOR MEASURING THE TORQUE OF A ROTATING SHAFT

BACKGROUND OF THE INVENTION

This invention relates generally to a device for measuring the torque on a rotating shaft. The invention more particularly relates to a torque measurement device making it possible to reduce the effects of longitudinal flexion on the accuracy of the measurement.

Publication FR-2,692,986 describes a device for measuring the torque on a rotating shaft, which device comprises two magnetic field generators, secured to a first support and situated in the plane of a cross-section of the shaft, and two magnetic field detector devices, secured to a second support and immobilized in the plane of another cross-section of the shaft. The two supports are connected together by a guide bearing which makes it possible to reduce the effects of the longitudinal flexion of the torque shaft on the variation in the reading radius and therefore on the accuracy of the torque measurement.

The device according to the invention exploits the particular properties of torque shafts which include a zone of reduced cross-section. The use of such shafts within a torque measurement device, with the aim of localizing the torsional deformation on said zone of reduced cross-section is known per se and described, for example, in the publication FR-2,661,246. However, such devices require the use of an intermediate bearing and may result in inaccuracies in the torque measurement.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a device for measuring the torque on a rotating shaft comprises two magnetic field generators fixed symmetrically with respect to the shaft in a first plane perpendicular to the shaft, and two magnetic field detector units, fixed symmetrically with respect to the shaft, in a second plane parallel to, and axially offset with respect to, the first plane. The detector units deliver a signal proportional to the torque owing to the relative angular offset of the generators with respect to the detector units such that the plane median to the first plane and second plane passes through the point of maximum deflection of the shaft under a longitudinal flexion force.

According to another characteristic of the invention, the shaft includes a zone of reduced cross-section on which the maximum deflection point is situated, and the generators and the detector units are respectively situated on a first support and a second support which are fixed on the shaft and which position the median plane at the height of said maximum deflection point.

According to another characteristic of the invention, the first and second supports each consist of a substantially tubularly shaped first element which extends around the shaft and on which a substantially annularly shaped second element which extends radially is fixed. According to another characteristic of the invention, the point of maximum deflection of the shaft under a longitudinal flexion force is plumb with the center of the zone of reduced cross-section.

The foregoing and other aspects will become apparent from the following detailed description of the inventin when considered in conjunction with the accompanying drawing figures.

BRIEF DESCRIPTION OF THE DRAWING FIGURES

DETAILED DESCRIPTION

Figure 1:
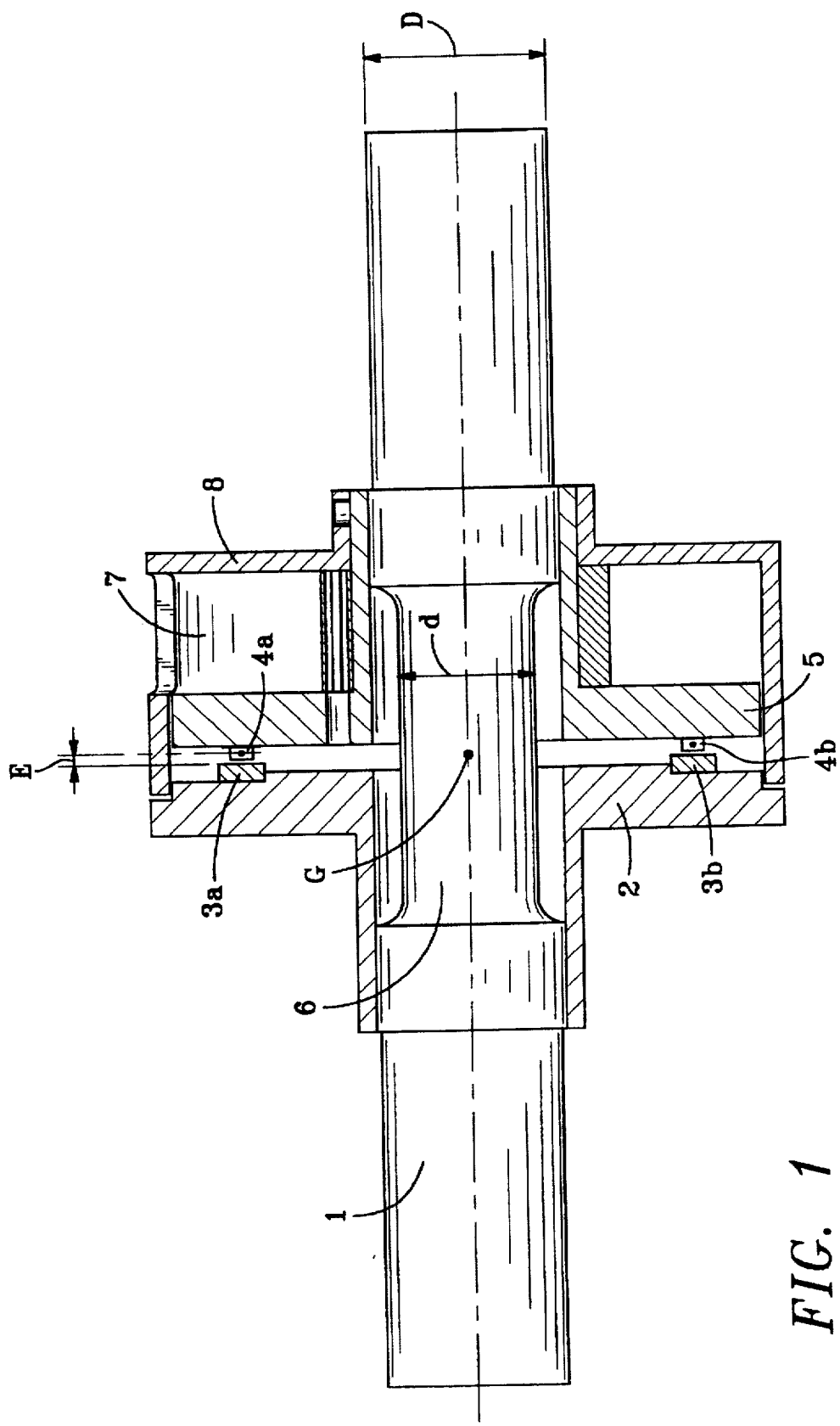
FIG. 1 is a longitudinal sectional view of the device according to the invention.

The device represented in FIG. 1 is intended for measuring the torque of a shaft 1 of diameter D. Its mode of operation is described in the document FR-2,692,986. A first support 2 is situated on shaft 1, and two magnetic field generators 3a and 3b having a magnetized structure with anti-parallel directions are fixed on this support, symmetrically with respect to shaft 1. Two magnetic field detector units 4a and 4b are fixed, symmetrically with respect to the shaft 1, on a second support 5 which is also situated on shaft 1, detector units 4a and 4b being axially offset with respect to generators 3a and 3b, separated by the air gap E.

Between first and second supports 2 and 5, shaft 1 includes a zone 6 of reduced cross-section which has a diameter d less than diameter D of shaft 1. Since the torsional moment of shaft 1 varies as a function of the fourth power of the diameter of shaft 1, the torsional stiffness varies, when moving from shaft 1 with diameter D to zone 6 of reduced cross-section, by the factor $(d/D)^4$. This variation in the stiffness makes it possible, in a manner known per se, by an expedient choice of the ratio d/D, to localize the torsional deformation of shaft 1 in zone 6 of reduced cross-section. It also makes it possible to improve the sensitivity of the torque measurement device.

Furthermore, the flexural stiffness of shaft 1 also varies as a function of the fourth power of the diameter of shaft 1. In consequence, the longitudinal flexural stiffness also varies, when moving from shaft 1 of diameter D to zone 6 of reduced cross-section, by the factor $(d/D)^4$. It is therefore possible to localize the longitudinal flexural deformation of shaft 1 and therefore the maximum deflection under loading in zone 6 of reduced cross-section. To this end, shaft 1 is held on two bearing elements located outside zone 6 of reduced cross-section. In general, the point of maximum deflection under a longitudinal flexion force is determined as a function of the loading conditions of shaft 1. In the particular case when the two supports are symmetrically located on either side of zone 6 of reduced cross-section, as represented in FIG. 2, the maximum deflection under a longitudinal flexion force is located at center G of zone 6 of reduced cross-section.

Figure 2:
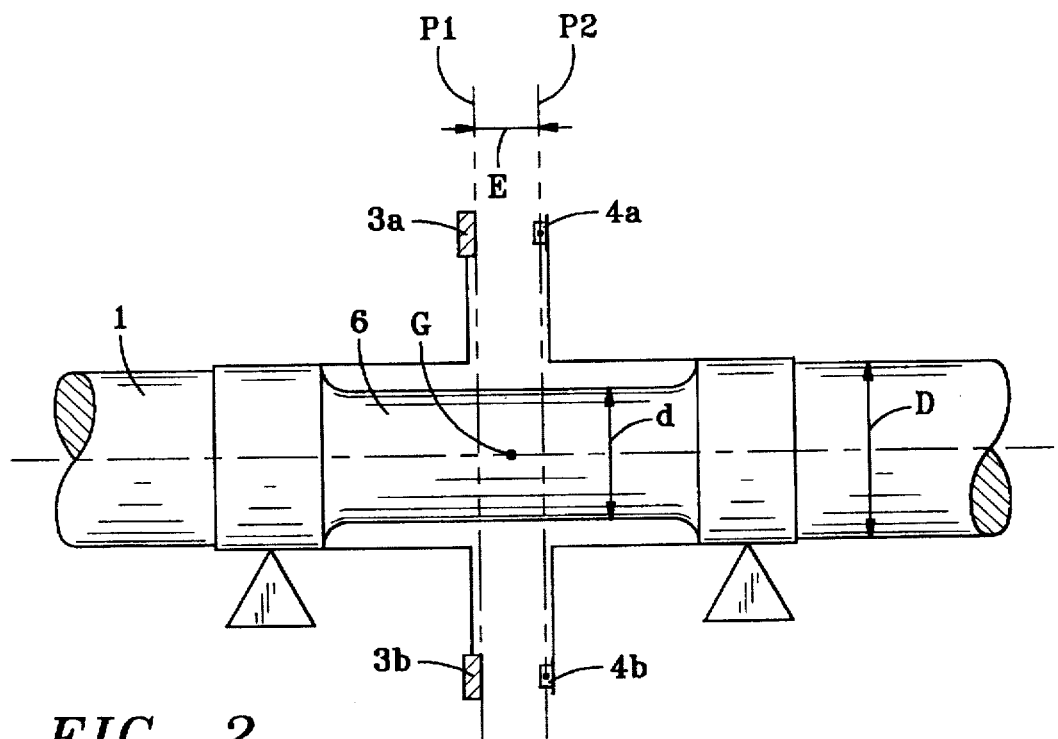
FIG. 2 is a schematic view of a variant of the device according to the invention, in which the median plane of the air gap passes through the point of maximum deflection of the shaft under a flexion force.

It is then particularly advantageous to make the median plane of air gap E pass through center G of zone 6 of reduced cross-section, as represented in FIG. 2. The median plane of air gap E is a plane median to first plane P1, perpendicular to shaft 1 and passing through the active faces of magnetic field generators 3a and 3b (the active faces of generators 3a and 3b are taken to mean the faces opposite detectors 4a and 4b) and to a second plane P2, perpendicular to shaft 1 and passing through magnetic field detector units 4a and 4b. In fact, in this configuration, the longitudinal flexion leads to a relative rotation of planes P1, P2 about an axis perpendicular to that of shaft 1.

Figure 3:
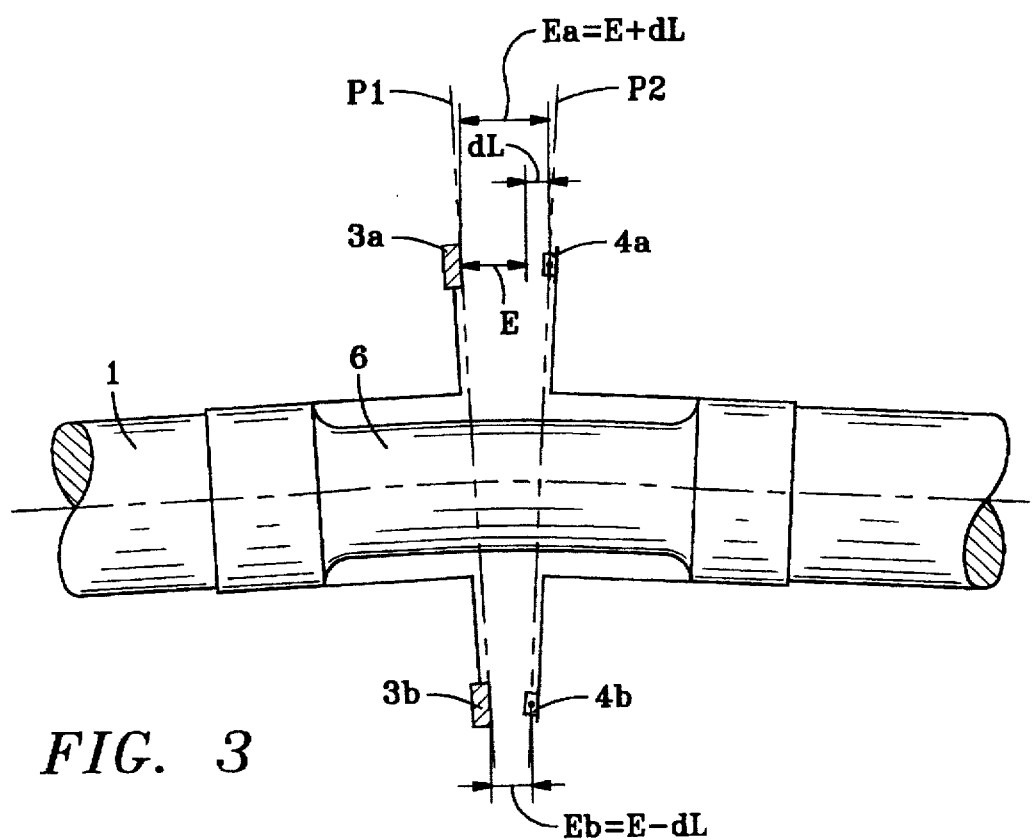
FIG. 3 is a schematic view of the device in FIG. 2 in longitudinal flexion.
Figure 4:
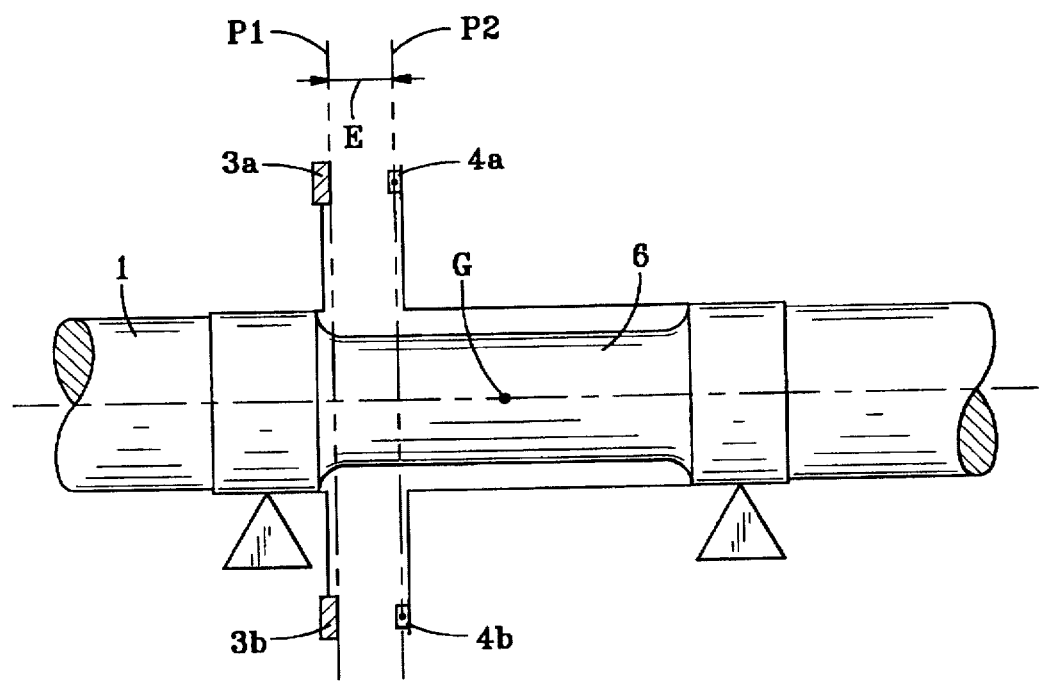
FIG. 4 is a schematic view of a device in which the median plane of the air gap does not pass through the point of maximum deflection of the shaft under a flexion force.
Figure 5:
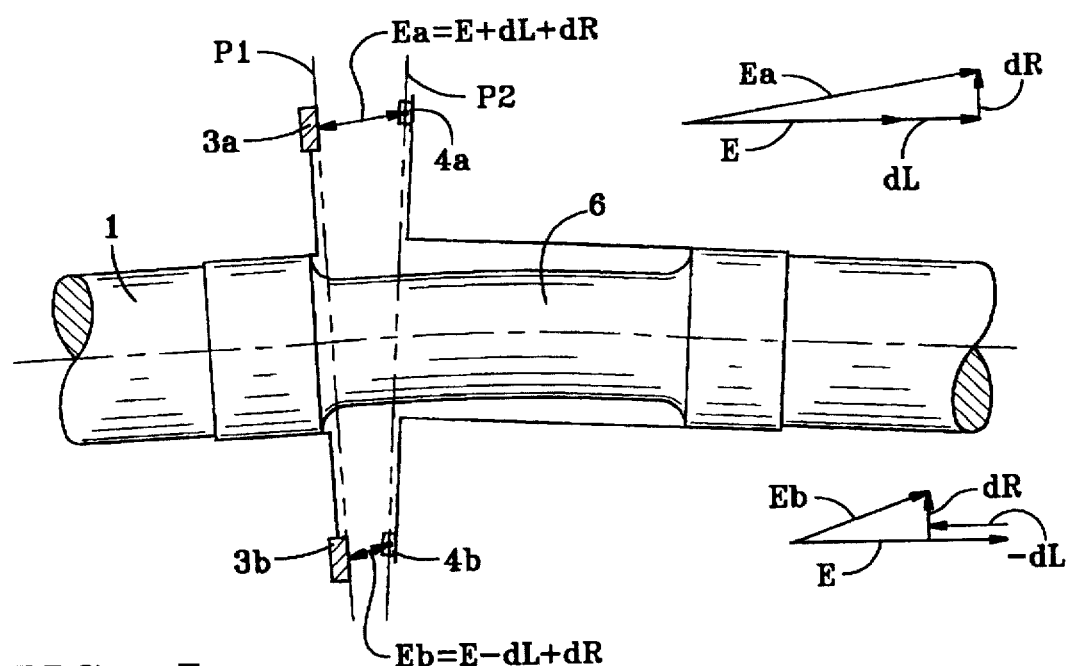
FIG. 5 is a schematic view of the device in FIG. 4 in longitudinal flexion.

The variations in air gap E which are caused by this rotation result in a variation, on the outside of the flexion, equal to the longitudinal extension +dL and a variation, on the inside of the flexion, equal to the longitudinal contraction −dL, as represented in FIG. 3. If the median plane does not pass through center G of zone 6 of reduced cross-section, as represented in FIG. 4, the flexion leads to an additional relative radial displacement of planes P1 and P2. This radial displacement leads to a radial component +dR of variation in air gap E, which is respectively added to longitudinal displacements +dL and −dL, as represented in FIG. 5, so as respectively to give a variation dR+dL, on the outside of the flexion, and a variation dR−dL, on the inside of the flexion.

The device according to the invention therefore makes it possible to eliminate the radial component of the variation in air gap E, caused by the longitudinal flexion of shaft 1, and therefore to limit this variation in air gap E to the longitudinal component. Now, the torque measurement taken by the device according to the invention is proportional to the algebraic sum of air gap Ea separating first generator 3a from first detector unit 4a and air gap Eb separating second generator 3b from second detector unit 4b. This means that, when the radial component is eliminated, the torque value measured is proportional to Ea+Eb=(E+dL)+(E−dL)=2E and therefore independent of the longitudinal flexion.

In contrast, in the presence of a radial component, the torque value measured is proportional to Ea+Eb=(E+dL+dR)+(E−dL+dR)=2E+2dR and therefore dependent on the longitudinal flexion. The fact that the median plane of air gap E is made to pass through the point of maximum deflection of shaft 1 therefore makes it possible to cancel the torque measurement error caused by the longitudinal flexion of the shaft.

According to the invention, supports 2 and 5 will be such that they make it possible to make the plane median to planes P1 and P2, respectively containing magnetic field generators 3a and 3b and magnetic field detector units 4a and 4b, pass through center G of longitudinal flexion of shaft 1. Since, in FIG. 1, detector units 4a, 4b are located on a rotating part, the electrical signal representative of the measured torque is relayed into a fixed reference frame, for example via a rotating connection of a spiral type cable 7, wound inside a protective casing 8.

Figure 6:
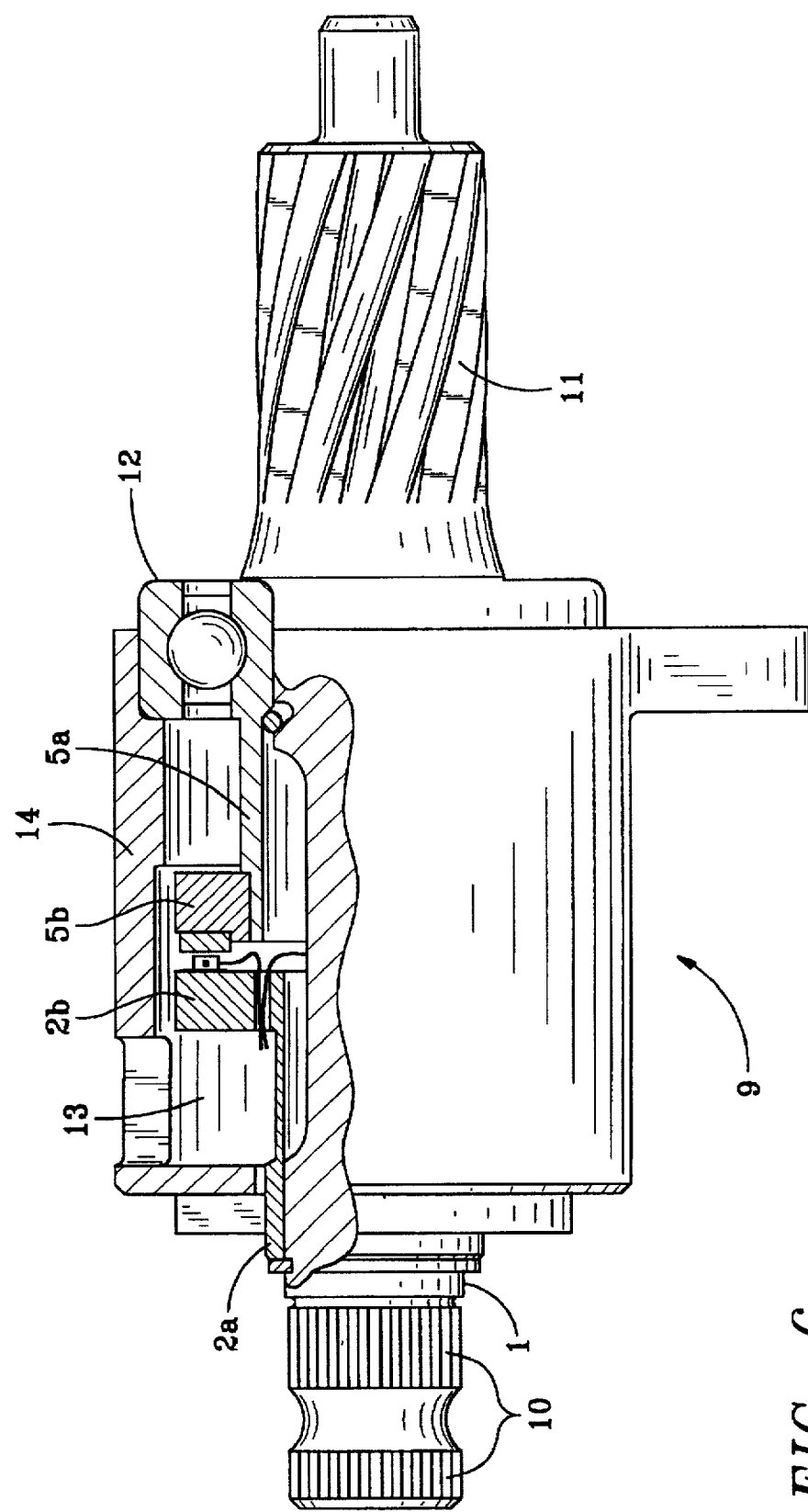
FIG. 6 is a fractional view including a longitudinal section of a variant of the device according to the invention, intended to be used within a power-assisted steering gear casing.

FIG. 6 is a representation of an application variant of the torque detector device according to the invention, incorporated into a power-assisted steering device 9. The ends of shaft 1 are designed respectively to produce splines 10 to make it possible to connect to a steering column shaft, on one end, and to form a rack pinion 11, on the other end. Support 2 of magnetic field generators 3a and 3b and support 5 of magnetic field detector units 4a and 4b each consists of a substantially tubularly shaped first element 2a, 5a which extends around shaft 1 and on which a substantially annularly shaped second element 2b, 5b is respectively fixed, this second element extending radially and being capable of turning respectively around first element 2a, 5a in order to make it possible to adjust the initial positioning of detector units 4a, 4b in the light of the magnetic transitions of magnetic field generators 3a, 3b. In the example in FIG. 6, second support 5 actually constitutes the extension of the inner race of mounting bearing 12. Rotating connection 13 may be incorporated into steering gear casing 14, as represented in FIG. 6.

The device according to the invention makes it possible to reduce the variation in the reading radius caused by the longitudinal flexion of the torque shaft and therefore to improve the accuracy of the torque measurement, while making it unnecessary to resort to an intermediate bearing.

Of course, the invention is in no way limited to the embodiment described and illustrated, which has been given only by way of example. In particular, it is anticipated, for example, that optical sensors may be used instead of magnetic generators and corresponding detectors.

Having described the invention, what is claimed is:

1. A device for measuring the torque on a rotating shaft, comprising two magnetic field generators fixed symmetrically with respect to the shaft in a first plane perpendicular to the shaft, and two magnetic field detector units, fixed symmetrically with respect to the shaft, in a second plane parallel to, and axially offset with respect to, the first plane, the shaft including a zone of decreased stiffness, in which device the detector units deliver a signal proportional to the torque owing to the relative angular offset of the generators with respect to the detector units, such that the plane median to the first plane and second plane passes through the point of maximum deflection of the shaft under a longitudinal flexion force and such that the point of maximum deflection of the shaft under a longitudinal flexion force is within the zone of decreased stiffness.

2. A device for measuring the torque on a rotating shaft, comprising two magnetic field generators fixed symmetrically with respect to the shaft in a first plane perpendicular to the shaft, and two magnetic field detector units, fixed symmetrically with respect to the shaft, in a second plane parallel to, and axially offset with respect to, the first plane, in which device the detector units deliver a signal proportional to the torque owing to the relative angular offset of the generators with respect to the detector units, such that the plane median to the first plane and second plane passes through the point of maximum deflection of the shaft under a longitudinal flexion force, wherein the shaft includes a zone of reduced cross-section on which the maximum deflection point is situated, and wherein the generators and the detector units are respectively situated on a first support and a second support that are fixed on the shaft and that position the median plane at the maximum deflection point.

3. The torque measurement device according to claim 2, wherein the first and second supports each consists of a substantially tubularly shaped first element which extends around the shaft and on which a substantially annularly shaped radially extending second element is fixed.

4. The torque measurement device according to claim 2, wherein the point of maximum deflection of the shaft under a longitudinal flexion force is plumb with the center of the zone of reduced cross-section.

5. The combination of a device for measuring the torque on a rotating shaft, comprising two magnetic field generators fixed symmetrically with respect to the shaft in a first plane perpendicular to the shaft, and two magnetic field detector units, fixed symmetrically with respect to the shaft, in a second plane parallel to, and axially offset with respect to, the first plane, in which device the detector units deliver a signal proportional to the torque owing to the relative angular offset of the generators with respect to the detector units, such that the plane median to the first plane and second plane passes through the point of maximum deflection of the shaft under a longitudinal flexion force, wherein the shaft includes a zone of reduced cross-section on which the maximum deflection point is situated, and wherein the generators and the detector units are respectively situated on a first support and a second support that are fixed on the shaft and that position the median plane at the maximum deflection point, and a power-assisted steering device whose mounting bearing is extended in order to constitute one of the supports.

* * * * *